United States Patent [19]
Abe

[11] Patent Number: 5,855,830
[45] Date of Patent: Jan. 5, 1999

[54] CONTROLLING DEVICE AND METHOD FOR EXTRUDER

[75] Inventor: Masahiko Abe, Takasago, Japan

[73] Assignee: Kabushiki Kaisha Kobe Seiko Sho, Kobe, Japan

[21] Appl. No.: 773,535

[22] Filed: Dec. 23, 1996

[30] Foreign Application Priority Data

Dec. 26, 1995 [JP] Japan ................................. 7-339602

[51] Int. Cl.⁶ ......................... B29C 47/32; B29C 47/92
[52] U.S. Cl. ..................... 264/40.1; 264/40.4; 264/40.5; 264/175; 264/210.2; 425/145; 425/149; 425/327; 425/363
[58] Field of Search ............................. 264/40.1, 40.4, 264/40.5, 40.7, 175, 210.2; 425/140, 141, 145, 149, 327, 363, 136

[56] References Cited

U.S. PATENT DOCUMENTS

| | | | |
|---|---|---|---|
| 2,382,177 | 8/1945 | Schanz . | |
| 4,304,539 | 12/1981 | Hagiwara et al. | 425/145 |
| 4,810,179 | 3/1989 | Cavanagh | 425/149 |
| 5,030,079 | 7/1991 | Benzing, II | 425/145 |
| 5,094,790 | 3/1992 | Halter | 264/40.5 |
| 5,262,101 | 11/1993 | Yagi et al. | 264/40.1 |
| 5,565,219 | 10/1996 | Hatanaka et al. | 425/145 |
| 5,607,703 | 3/1997 | Sakai et al. | 264/40.7 |

FOREIGN PATENT DOCUMENTS

| | | |
|---|---|---|
| 0 429 161 A1 | 5/1991 | European Pat. Off. . |
| 21 41 741 | 2/1973 | Germany . |
| 40 34 144 A1 | 2/1991 | Germany . |
| 2055 680 | 3/1981 | United Kingdom . |
| 2 237 239 | 1/1991 | United Kingdom . |

Primary Examiner—Mathieu D. Vargot
Attorney, Agent, or Firm—Oblon, Spivak, McClelland, Maier & Neustadt, P.C.

[57] ABSTRACT

Controlling device and method for an extruder which can continuously process materials of different kinds without burning a following material and without causing variation in physical properties by allowing the following material to succeed to a preceding material without running out of sheet when the materials are replaced. In an extruder in which a roller die 2 having upper and lower parallel rollers 9 is arranged in front of an outlet of an extruder body 1 rotatably including screws 3 for extruding material and a bank portion 12 surrounded by the upper and lower rollers 9 and a side guide 20 closing both of right and left sides of the outlet 7 is formed, the roller die 2 is once stopped when the quantity of the bank portion 12 reaches the bank quantity which is the minimum for the preceding material to be extruded to be succeeded by the following different material to be extruded. After that, the roller die 2 is again activated when the following material reaches a predetermined bank quantity in the bank portion 12.

4 Claims, 11 Drawing Sheets

CONTROLLING DEVICE AND METHOD FOR EXTRUDER

BACKGROUND OF THE INVENTION

1. Field of the Invention

The present invention relates to an extruder and a method of controlling the extruder for extruding a high polymer material such as rubber to form a sheet.

2. Description of the Prior Art

This kind of extruder is provided with a roller die having a pair of upper and lower rollers on the outlet side of an extruder body. A material supplied from a batch type mixer into the extruder body is extruded by a screw provided in the extruder body and is allowed to pass between the pair of upper and lower rollers of the roller die, thus forming a sheet from the extruded material.

In such an extruder, a bank quantity of the material accumulated in a bank portion defined between the outlet of the extruder body and the roller die must be properly controlled to uniform the shape (width, thickness, etc.) of the sheet to be discharged.

A bank control system (for example, Japanese Patent Publication No. 55-4575) for controlling the bank quantity is known. According to the system, the bank quantity in the bank portion, a load applied to rollers, a bank pressure are detected by sensor equipment such as cylinder, load cell, pressure sensor, and the like when the two rollers rotate at a constant speed. A sheet is formed from the extruded material while increasing/decreasing the screw speed so that detected values are equal to set values, respectively.

However, the conventional bank control system has only a feedback control function of setting volume and pressure of the material in the bank portion to preset bank quantity target values in order to uniform the shape of the sheet. In order to continuously extrude the materials of different kinds, when a preceding material to be extruded is succeeded by a following different material to be extruded, the bank quantity in the bank portion can be set to only the target value to uniform the sheet shape.

When the materials of different kinds are continuously extruded, there is a case that the preceding material continues to remain in the bank portion and is mixed with the following material, and as a result, the following material is burnt or properties of the material vary.

In order to solve the problems, it can be considered that the smallest possible bank quantity in the bank portion is designed to be detected and the preceding material is reduced to the smallest possible bank quantity the preceding material can be succeeded by the following material, and then both of the materials are mixed.

However, since means (refer to FIG. 4 for example) for directly measuring the bank quantity in the bank portion by a cylinder, a phototube, or the like measures the level of the material in the bank portion only from the upper portion of the outlet, the small bank quantity cannot be measured.

On the other hand, means (refer to FIG. 12 for example) for detecting a load applied to rollers by a load cell and estimating the bank quantity from the detected load has the difficulty of correctly detecting the volume from the load since kinds and hardness of materials are different. Therefore, when an attempt is made to reduce the bank quantity in the bank portion as much as possible on the basis of the detection value by the load cell, it happens that no preceding material to be extruded remains in the bank portion due to a measurement error, and it causes running out of sheet.

SUMMARY OF THE INVENTION

In consideration of the above, it is an object of the invention to provide controlling device and method for an extruder, which can continuously process different kinds of materials without burning the following material and causing no variation in properties of the following material in such a manner that the preceding material is succeeded by the following material without causing running out of sheet when the materials are replaced and without leaving the preceding material.

It is another object of the invention to obtain the controlling device for the extruder as cheap as possible.

In order to achieve the objects, the invention provides the following technical means.

According to the invention, there is provided a controlling device which is applied to an extruder in which a roller die comprising a pair of upper and lower parallel rollers is arranged in front of an outlet of the extruder body rotatably having screws for extruding material and a bank portion surrounded by the upper and lower rollers and a side guide closing both of right and left sides of the outlet is formed, comprising: minimum bank quantity detecting means which is provided for the side guide and detects a predetermined bank quantity which is the minimum for a preceding material that is extruded to be succeeded by a following material that is extruded in the bank portion; and roller die stop control means for stopping the roller die when the minimum bank quantity detecting means detects that the bank quantity decreases to the minimum bank quantity.

The controlling device further comprises: bank quantity detecting means for detecting a predetermined bank quantity at which the extruder can be operated; and roller die activation control means for activating the roller die when the bank quantity detecting means detects that the bank quantity increases to a predetermined bank quantity.

According to the invention, there is provided a controlling method applied to an extruder in which a roller die comprising upper and lower parallel rollers is arranged in front of an outlet of the extruder main body rotatably having screws for extruding material and a bank portion surrounded by the upper and lower rollers and a side guide closing both of right and left sides of the outlet is formed, the method comprising: a step of detecting that a bank quantity reaches a predetermined bank quantity which is the minimum for a preceding material to be extruded to be succeeded by a following different material to be extruded in the bank portion, a step of stopping the roller die when it is detected that the bank quantity decreases to the minimum bank quantity; a step of supplying the following material to the bank portion; a step of detecting that the bank quantity reaches a predetermined bank quantity at which the extruder can be operated; and a step of activating the roller die when it is detected that the bank quantity increases to a predetermined quantity.

Figure 3:
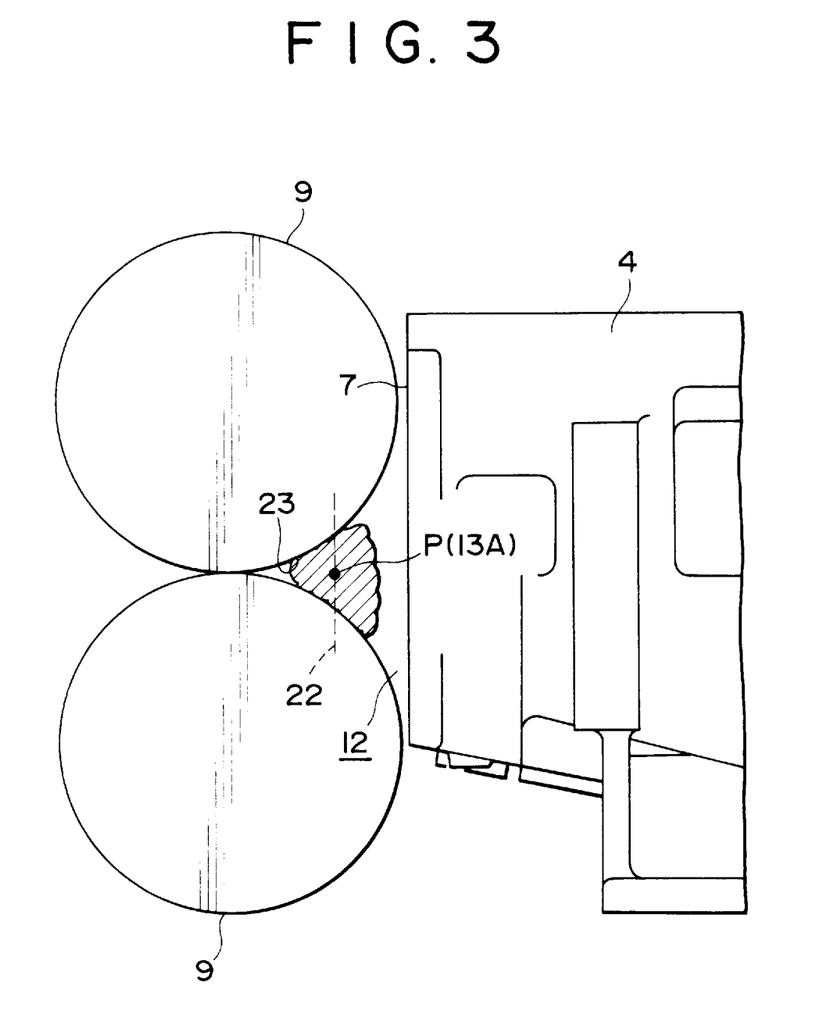
FIG. 3 is a side view of the front portion of the extruder for showing an attaching position of a minimum bank quantity detecting means.

According to the invention, since the roller die is once stopped when the quantity of the preceding material reaches the bank quantity which is the minimum for the preceding material to be succeeded by the following material in the bank portion, the preceding material remains only in a delta portion (a portion 23 surrounded by a broken line 22 and rollers 9 in FIG. 3) in the bank portion and does not remain in other portions.

After that, the following material to be extruded is charged into the bank portion. When the quantity of the material is restored to a predetermined bank quantity, the roller die is again activated. Therefore, the preceding material is succeeded by the following material in the delta portion without being left in the bank portion and the continuous extruding operation can be performed.

The "minimum bank quantity the preceding material can be succeeded by the following material" denotes a state where the preceding material remains only in the "delta portion". Although the quantity to be specifically set differs depending on the kind of resin and the construction of a device, it is found to be about 5 to 15% of the capacity of the bank portion.

On the other hand, when a pressure sensor for detecting the pressure of the material to be extruded in the bank portion is adapted as the minimum bank quantity detecting means, the detecting means can be also used as a pressure detecting means for obtaining a bank quantity target value to uniform the shape of sheet.

DETAILED DESCRIPTION OF THE PREFERRED EMBODIMENTS

An embodiment of the invention will be described hereinbelow with reference to the drawings.

Figure 1:
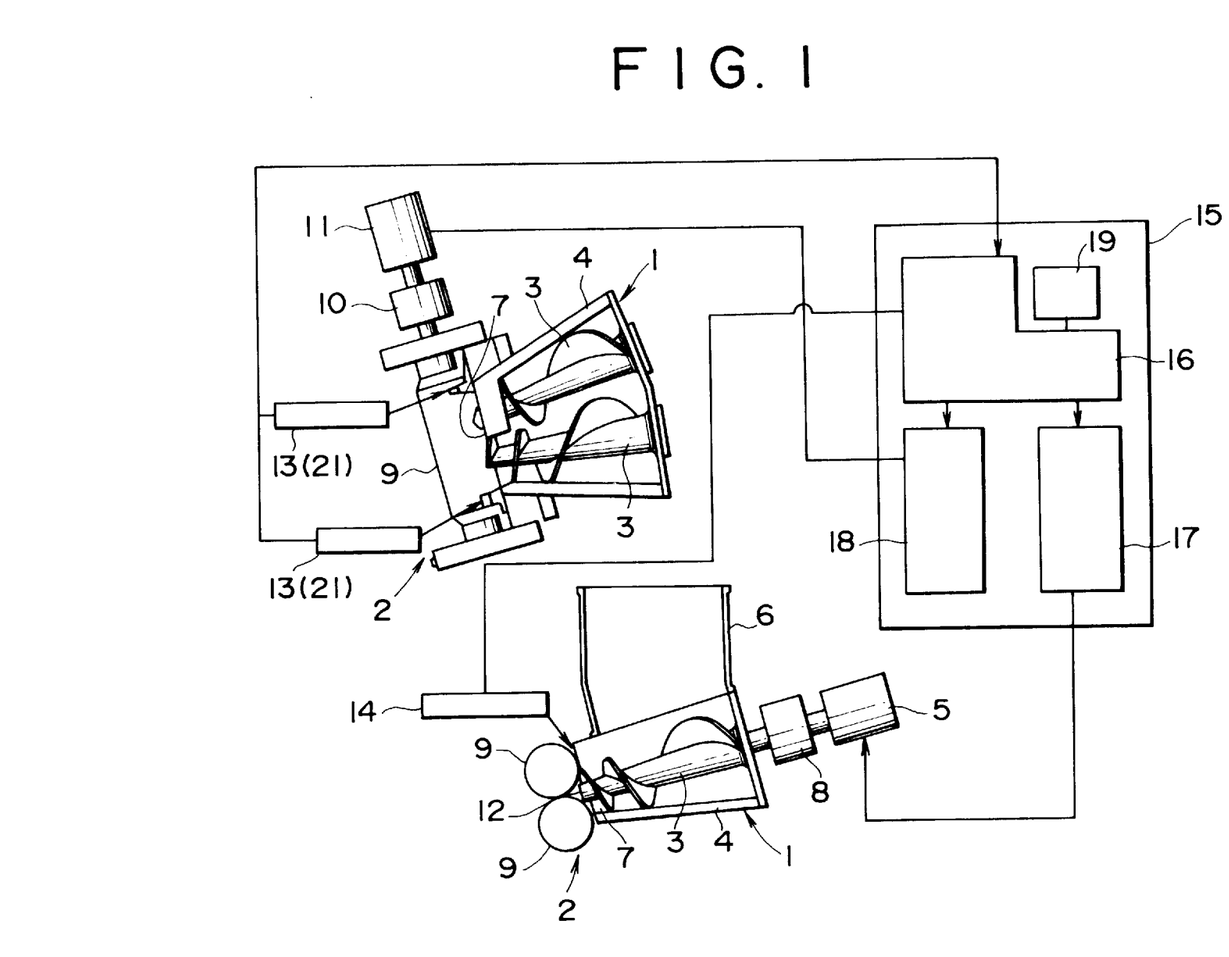
FIG. 1 is a block diagram of an extruder according to an embodiment of the invention.

In FIG. 1, a roller head extruder has an extruder body 1 and a roller die 2. The extruder body 1 has a pair of extruding screws 3, a chamber 4 in which the screws 3 are rotatably held, and a motor 5 for rotating the screws 3.

The chamber 4 has a hopper 6 for charging a material on the top face side and an outlet 7 on the end side. The pair of screws 3 are interlockingly connected via a gear reducer 8 at the base portion side and the ends face the outlet 7 of the chamber 4.

The roller die 2 has a pair of upper and lower rollers 9 disposed in front of the outlet 7 of the chamber 4. The pair of upper and lower rollers 9 are interlockingly connected via a gear reducer 10 so as to reversely rotate each other and are rotated by a calender roll drive motor 11.

A bank portion 12 for accumulating a material to be extruded, which is surrounded by the upper and lower rollers 9 is formed and a side guide 20 which closes the right and left sides of the outlet 7. The bank portion 12 is provided with pressure sensors 13 for sensing a bank pressure (pressure of the material to be extruded, which is accumulated in the bank portion 12) and a bank quantity detector 14 for detecting a bank quantity (quantity of the material to be extruded which is accumulated in the bank portion 12).

Further, the side guide 20 is provided with minimum bank quantity detectors 21 for detecting the bank quantity which is the minimum for a preceding material to be extruded to be succeeded by a following different material to be extruded in the bank portion 12. In the embodiment, the pressure sensor 13 has the role of the minimum bank quantity detector 21.

Figure 2:
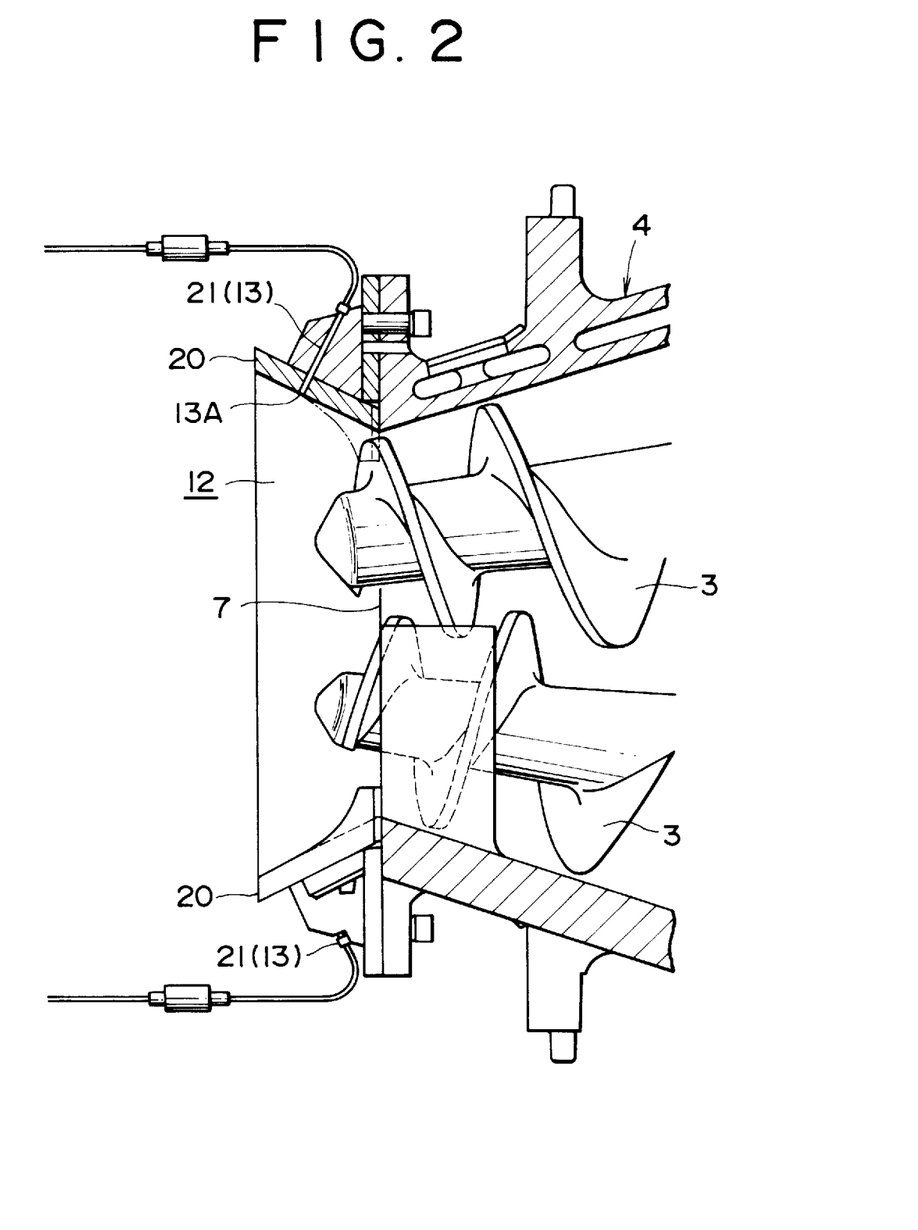
FIG. 2 is a sectional plan view of the front portion of the extruder.

The pressure sensor 13 is constructed by, for example, a resin pressure meter or the like. As shown in FIG. 2, the pair of right and left pressure sensors 13 which are attached to the side guide 20 so that detecting units 13A are located in the delta portion sandwiched by the rollers 9 in the bank portion 12. The installation position P of each of the detecting units 13A of the pressure sensors 13 is set to a position as close to the front of the extruding direction deft side of FIG. 3) as possible until the limit is reached which will still provide for a continuous succession of the following material to the preceding material in the bank portion 12.

When the detection value of the pressure sensor 13 becomes zero, the resin in the bank portion 12 passes the installation position P of the detecting unit 13A shown in FIG. 3 and the quantity of the resin in the bank portion 12 is equal to "the minimum bank quantity" corresponding to a delta portion 23 surrounded by a broken line 22 passing the installation position P and the upper and lower rollers 9.

Although it is found that "the minimum bank quantity" lies within a range of about 5 to 15% of the capacity of the bank portion 12 in this extruder, since the minimum bank quantity varies depending on the kind of resin and the construction of an apparatus, it is necessary to obtain the minimum bank quantity for every kind of machine by experiments.

Figure 4:
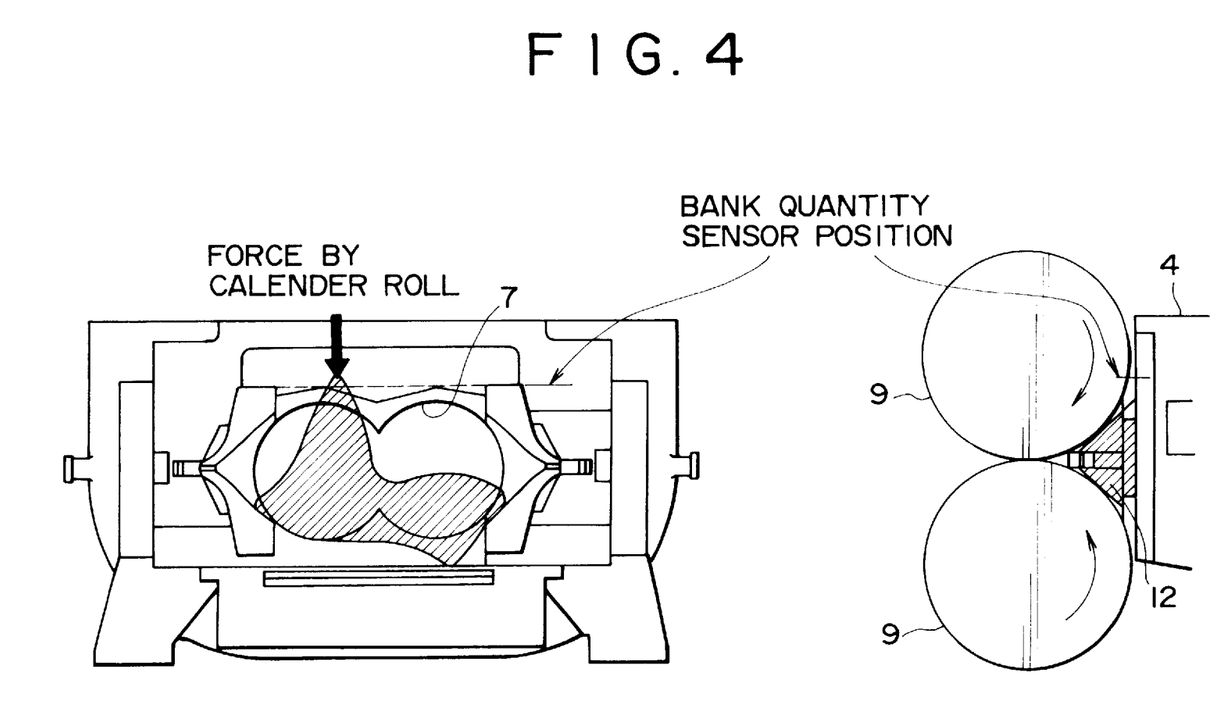
FIG. 4 is a view illustrating a state where a bank quantity is increased and a bank quantity detector is operated.
Figure 5:
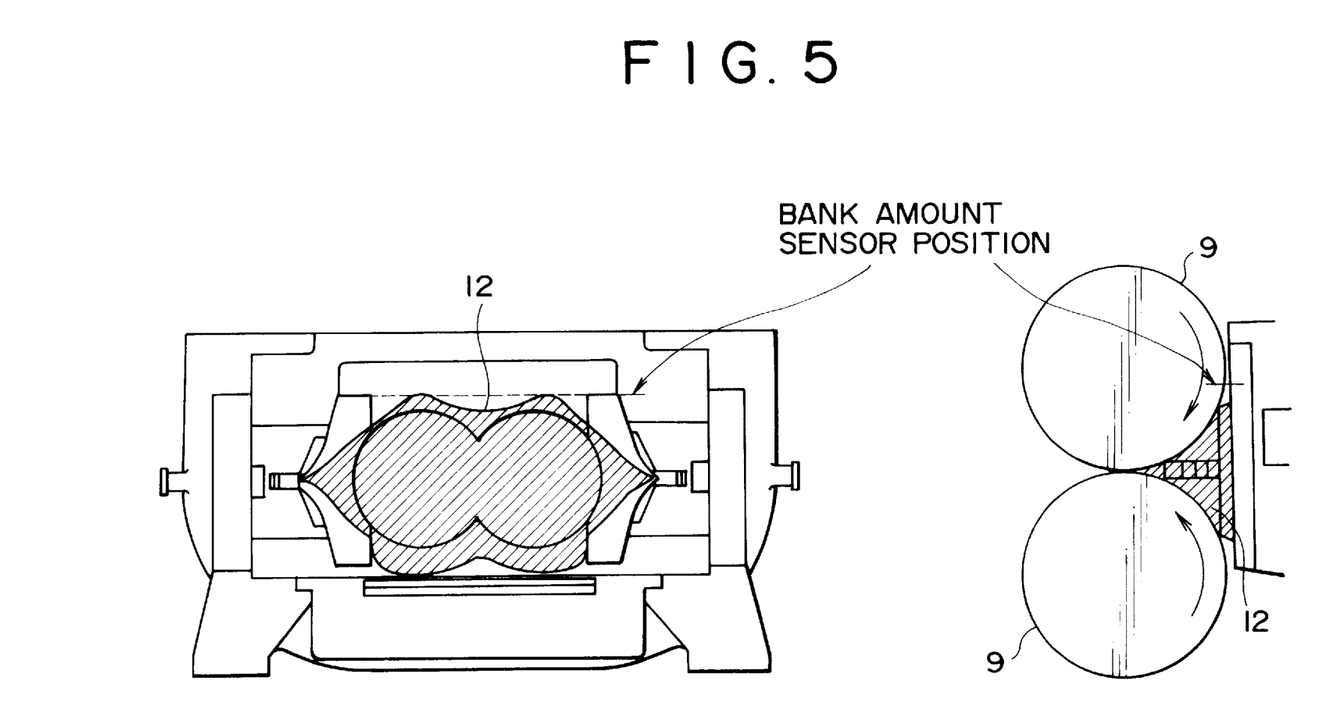
FIG. 5 is a view illustrating a state where a bank quantity is decreased and the bank quantity detector is turned off.

As shown in FIGS. 4 and 5, the bank quantity detector 14 is constructed as a level sensor employing a phototube or the like and is provided to sense that the level of the material accumulated in the bank portion 12 reaches a predetermined level. In the embodiment, the bank quantity detector 14 is designed to detect a single level of the resin.

As shown in FIG. 1, all of the screw drive motor 5, the calender roll drive motor 11, the pressure sensor 13 (minimum bank quantity detector 21) and the bank quantity detector 14 are connected to a control device 15.

The control device 15 has a processor 16 connected to the pressure sensor 13 and the bank quantity detector 14, a screw drive motor control panel 17 and a calender drive motor control panel 18 which are operated by commands of the processor 16.

The processor 16 controls the rotational speeds of the screw 3 and the rollers 9 by feeding back the difference between the pressure detected by the pressure sensor 13 and a set target pressure to the screw drive motor control panel 17 and the calender drive motor control panel 18, thereby maintaining the bank quantity of the material in the bank portion 12 to the target value.

When a predetermined bank quantity is detected by the bank quantity detector 14, the bank pressure is detected by the pressure sensor 13, and the processor 16 obtains the correlation between the bank quantity and the bank pressure from the detected bank quantity and the detected bank pressure.

Figure 6:
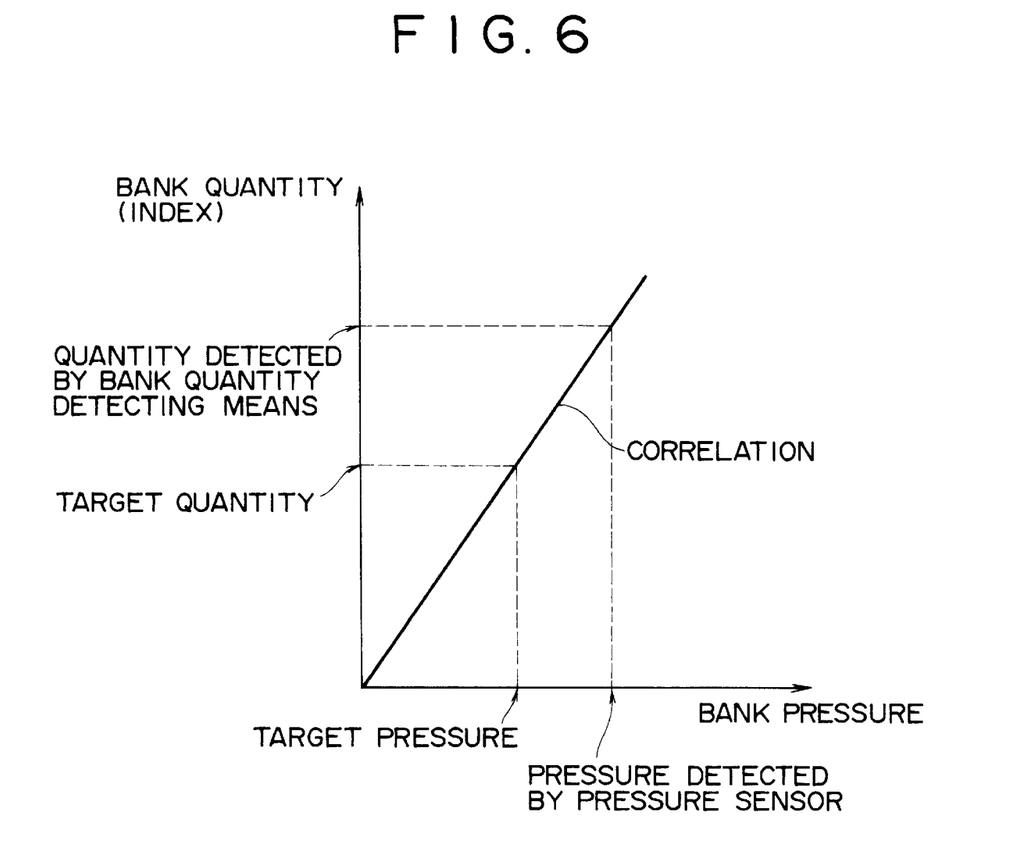
FIG. 6 is a graph showing the correlation between a bank quantity and a bank pressure.

In case of the embodiment, as shown in FIG. 6, since the bank quantity detector 14 detects a single level, the correlation between the detected bank quantity and the detected bank pressure is obtained as a single point. The bank quantity corresponds to the bank pressure in a one-to-one manner. The relation of them is obtained as a straight line and is specified as a constant of proportion between the bank quantity and the bank pressure. As shown in FIG. 6, the processor 16 has a function of converting the target bank quantity into a pressure value by using the proportional constant obtained from the relation between a certain bank quantity and a bank pressure and setting the derived pressure value to the set target pressure.

The control device 15 includes a storing unit 19 for storing the proportional constant obtained from the relation between the bank quantity and the bank pressure with respect to a certain specific material (resin) to be extruded.

In order to continuously extrude materials of different kinds by the roller head extruder, the processor 16 has functions to judge that the preceding material in the bank portion 12 becomes the "minimum" when the detection value of the pressure sensor 13 (minimum bank quantity detector 21) is equal to zero. The processor 16 stops the roller die 2 by operating the calender drive motor control panel 18 on the basis of the detection value (zero). After that, when the quantity of the following material reaches a predetermined bank quantity in the bank portion 12, the processor 16 activates the roller die 2 again.

Figures 7, 7A:
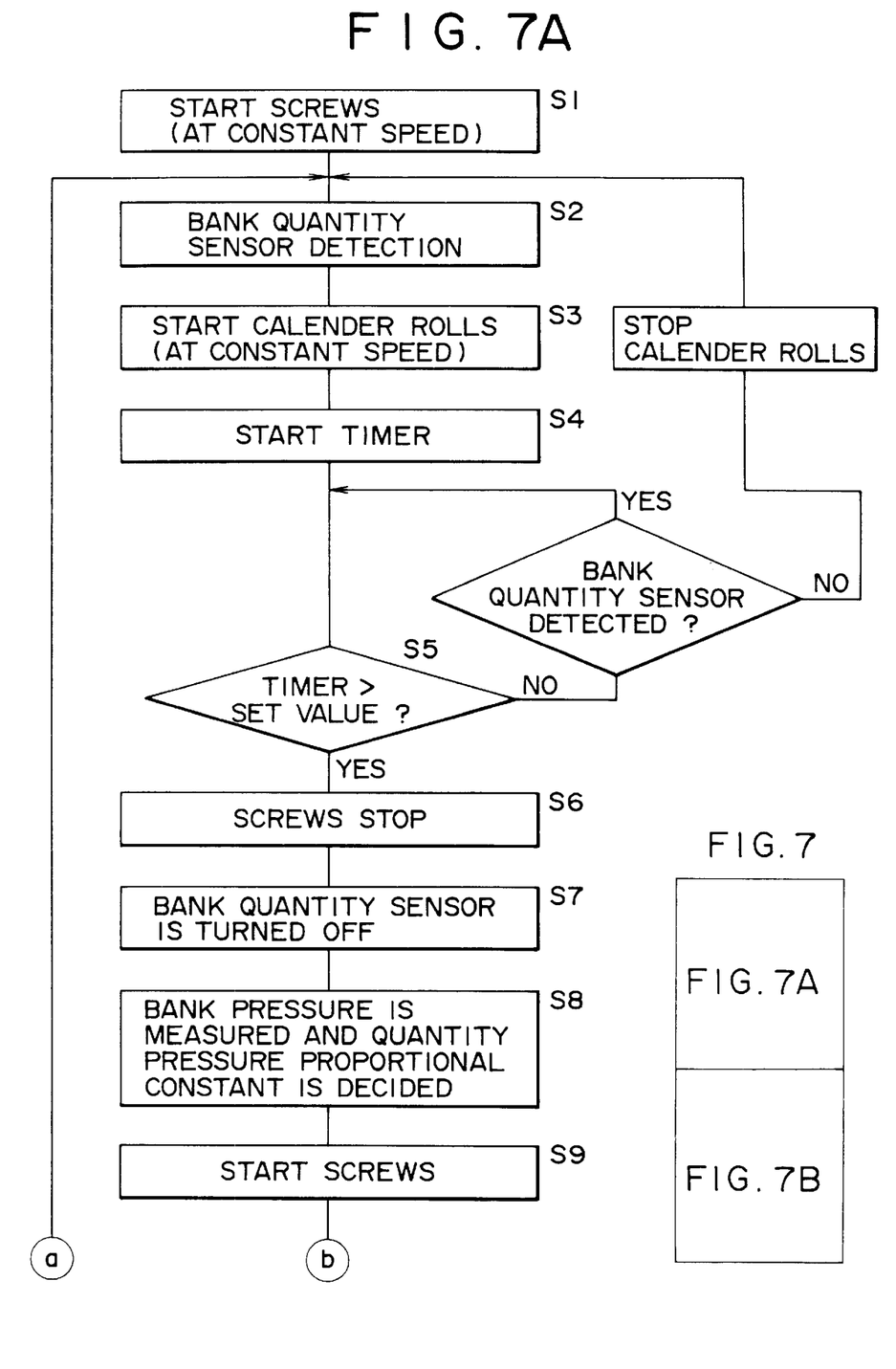
FIG. 7 is a flowchart showing the function of processing means.
Figure 7B:
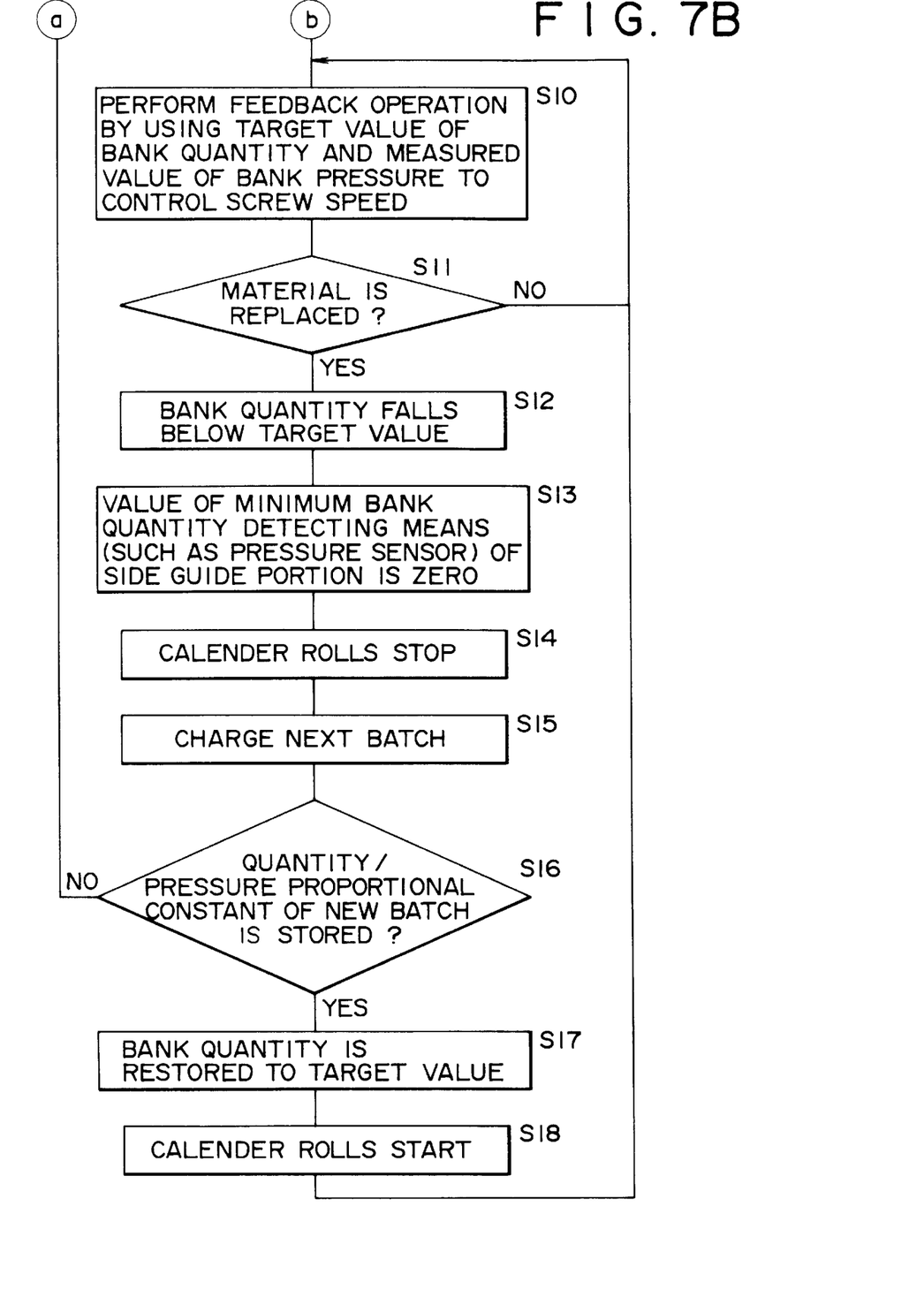
Figure 8:
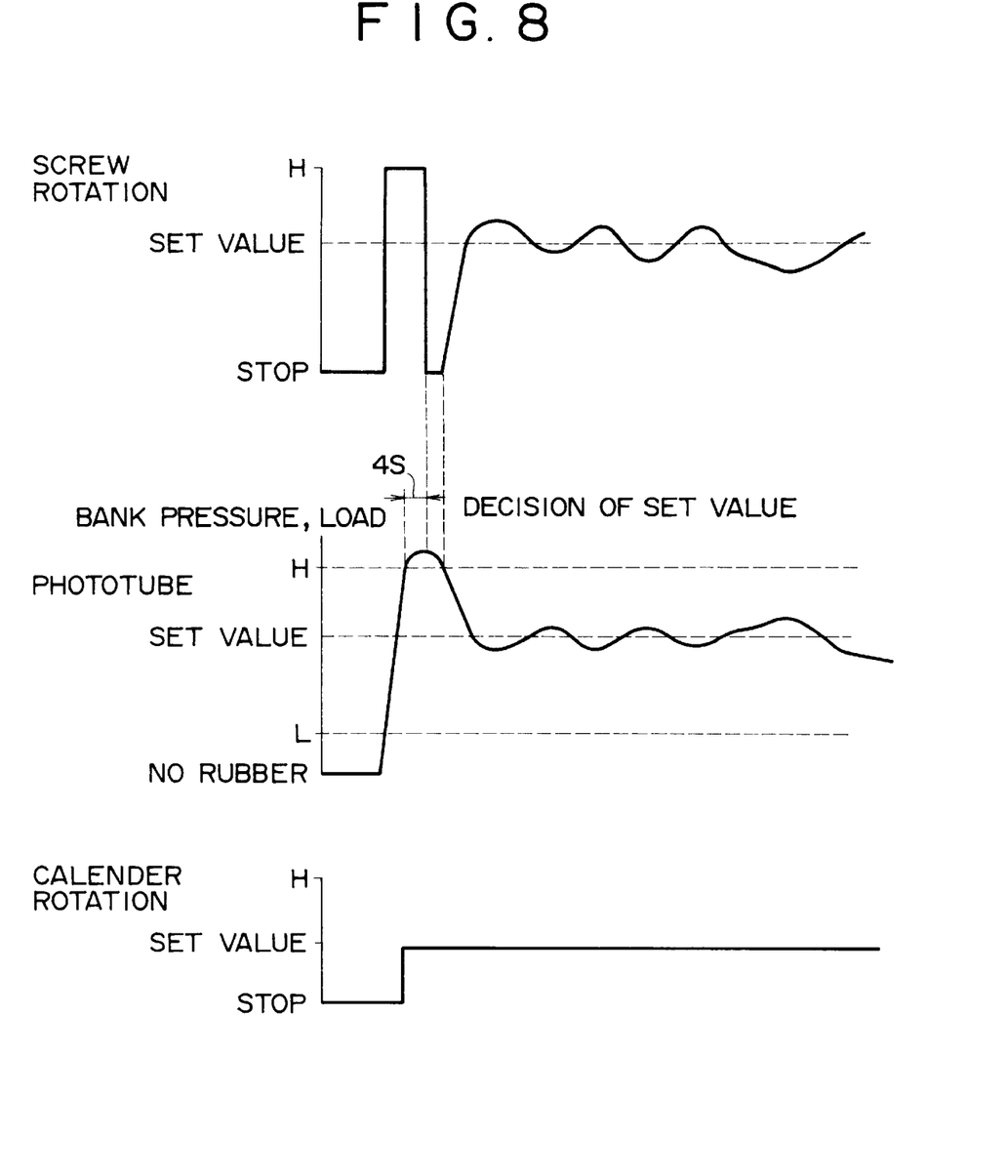
FIG. 8 is a graph showing the relation between screw speed, bank quantity, and roller speed.

FIG. 7 shows a flowchart of control in the processor 16. FIG. 8 shows change in bank quantity on the time base.

In FIG. 7, the screw 3 rotates at a constant speed by the activation of the screw drive motor 5. The material charged from the hopper 6 is extruded by the screws 3 from the outlet 7 to the bank portion 12 (step S1).

The extruded material gradually increases in quantity. As shown in FIG. 4, when the level of the material reaches the detection level of the bank quantity detector 14, the level is detected by the detector 14 (step S2).

The calender drive motor 11 for the roller die 2 is automatically activated and the pair of upper and lower rollers 9 start to rotate at a line speed (constant speed) (step S3).

Since an initially set discharge according to the screw speed is set greater than a discharge according to the line speed of the roller die 2, the material in the bank portion 12 continues to increase. When the material in the bank portion 12 continues to increase over the predetermined detection level of the bank quantity detector 14 for a predetermined time (about 4 to 10 seconds) (steps S4 and S5), the screws 3 are once stopped (step S6).

When the screws 3 are stopped as mentioned above, the bank quantity decreases and the level of the material shortly reaches the detection level of the bank quantity detector 14. The bank quantity detector 14 is turned off (step S7).

The bank pressure at the moment when the bank quantity detector 14 is turned off is detected by the pressure sensor 13. The constant of proportion between the bank pressure and the bank quantity is determined by the processor 16 as shown in FIG. 6 (step S8).

The target value (which is preliminary set) of the bank quantity of the bank portion 12 is converted into a pressure value by using the determined proportional constant. The pressure value is set as the set target pressure and the difference between the target pressure and the measured bank pressure is fed back to control the screw speed (steps S9 and S10).

In the above operation, the quantity to pressure conversion is carried out after the level of the material in the bank portion 12 exceeds the detection level of the bank quantity detector 14 and is then decreased to reach the detection level. Alternatively, the quantity to pressure conversion may be carried out when the level of the material exceeds the first detection level (i.e., at the time of S2).

However, when the level of the material exceeds the detection level for the first time, the upper surface of the material existing in the bank portion 12 is considerably uneven as shown in FIG. 4. Therefore, in terms of improvement in control accuracy, it is more preferable to carry out the pressure to quantity conversion after the rollers 9 are once rotated on the face of the material to apply a downward force to projected portions to smoothen the upper surface as shown in FIG. 5.

When the material is not replaced, the feedback control is repeated. When the material is replaced, since the following material is not supplied to the bank portion 12 until the preceding material decreases in the bank portion 12, the bank quantity of the preceding material is reduced until it falls far below the target value (steps S11 and S12).

When the detection value of the pressure sensor (minimum bank quantity detector 21) of the side guide 20 becomes zero (step S13), the roller die 2 is stopped and the following material to be extruded is charged as a next batch into the hopper 6 (steps S14 and S15).

In this case, since the screws 3 are still rotating, the following material is supplied to the bank portion 12, the quantity of the resin in the bank portion 12 increases, and the bank quantity is shortly returned to the target value (step S17). When the properties of the following material are largely different from those of the preceding material, the proportional constant between the bank pressure and the bank quantity obtained as shown in FIG. 6 has to be changed to that of the following material.

When the proportional constant of the following material is stored in the storing unit 19 (step S16), the target value of the bank quantity is set by using the proportional constant (step S17) and the roller die 2 is again activated (step S18).

On the other hand, when the proportional constant of the following material is not stored in the storing unit 19 (step S16), the processing routine has to be returned to step S2 to obtain the proportional constant by the processor 16.

Figure 9:
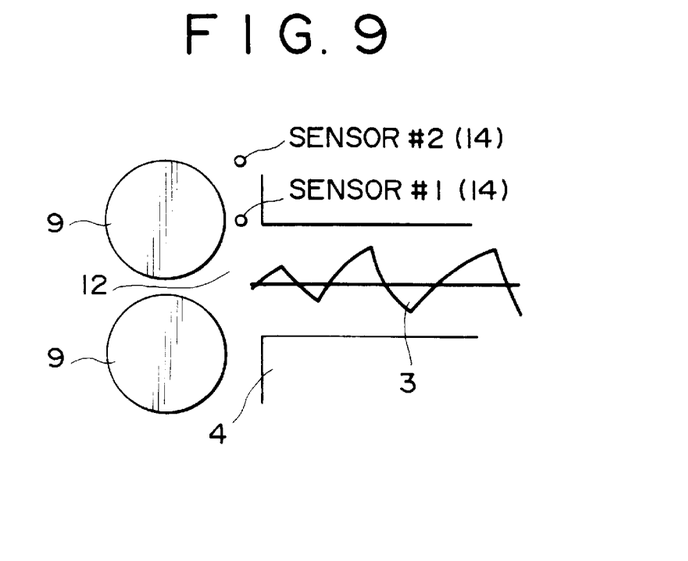
FIG. 9 is a sectional view of an essential part in modification wherein bank quantity detectors are provided at two positions.
Figure 10:
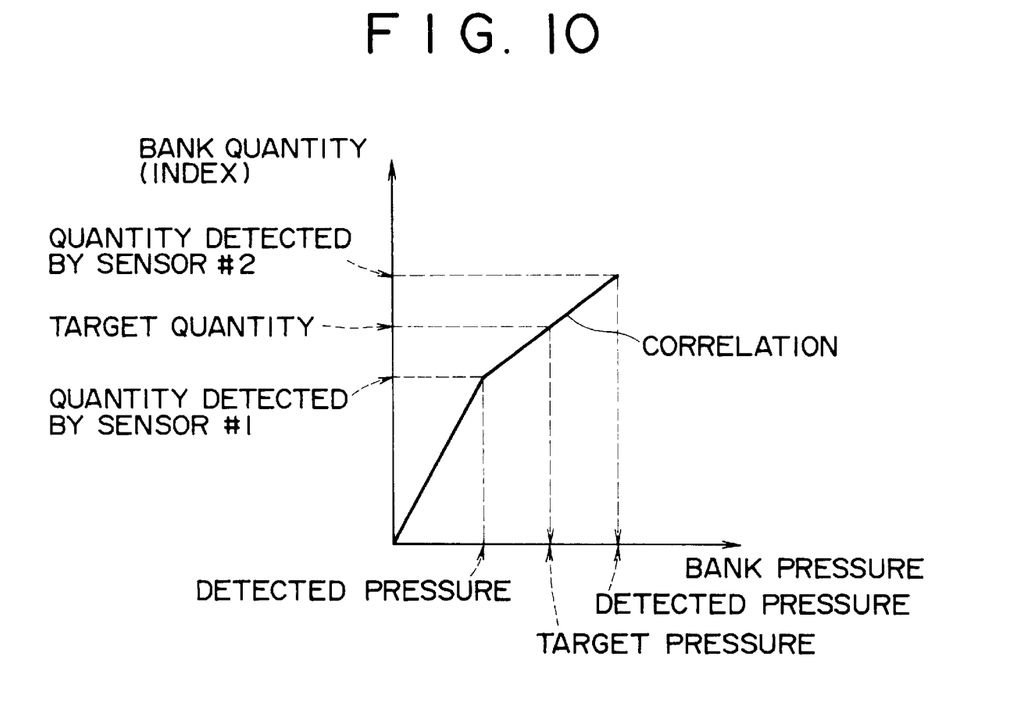
FIG. 10 is a graph showing the correlation between the bank quantity and the bank pressure represented as a polygonal line.
Figure 11:
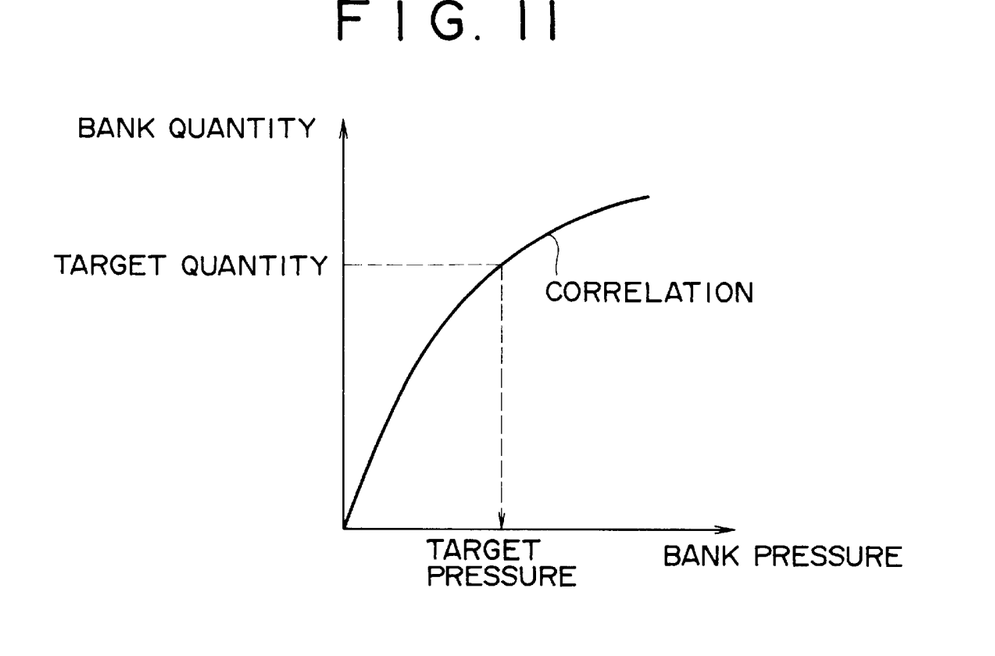
FIG. 11 is a graph showing the correlation between the bank quantity and the bank pressure represented as a curved line.

FIGS. 9 to 11 show another embodiment in which bank quantity detectors 14 are provided so as to detect both of the level at the lower position and the level at the higher position.

In this case, by obtaining the bank pressure when the bank quantity is detected by the respective bank quantity detectors 14, the correlation between the bank quantity and the bank pressure can be obtained as a polygonal line shown in FIG. 10.

When the bank quantity detectors 14 are provided to detect a number of levels more than two, the correlation between the bank quantity and the bank pressure can be obtained as a curve f(x) shown in FIG. 11.

Both of the correlations obtained as mentioned above can be obtained by the processor 16 as conversion formulas of the bank quantity and the bank pressure as shown in FIGS.

10 and 11. The target value of the bank quantity in the bank portion 12 is converted into the pressure value by using the conversion formula. The derived pressure value is used as the set target pressure. The difference between the target pressure and the actually measured bank pressure is fed back, thereby controlling the speed of the screws.

This embodiment is similar to the foregoing embodiment with respect to a point that it is detected by the pressure sensor 13 (minimum bank quantity detector 21) that the quantity of the preceding material becomes the minimum bank quantity, and after that, the following material is supplied to the bank portion 12, except that the correlation between the bank quantity and the bank pressure determined by the processor 16 is changed to that shown in FIGS. 10 or 11.

The invention is not limited to the foregoing embodiments.

For example, a temperature sensor which is separately provided from the pressure sensor 13 can be used as the minimum bank quantity detector 21.

Figure 12:
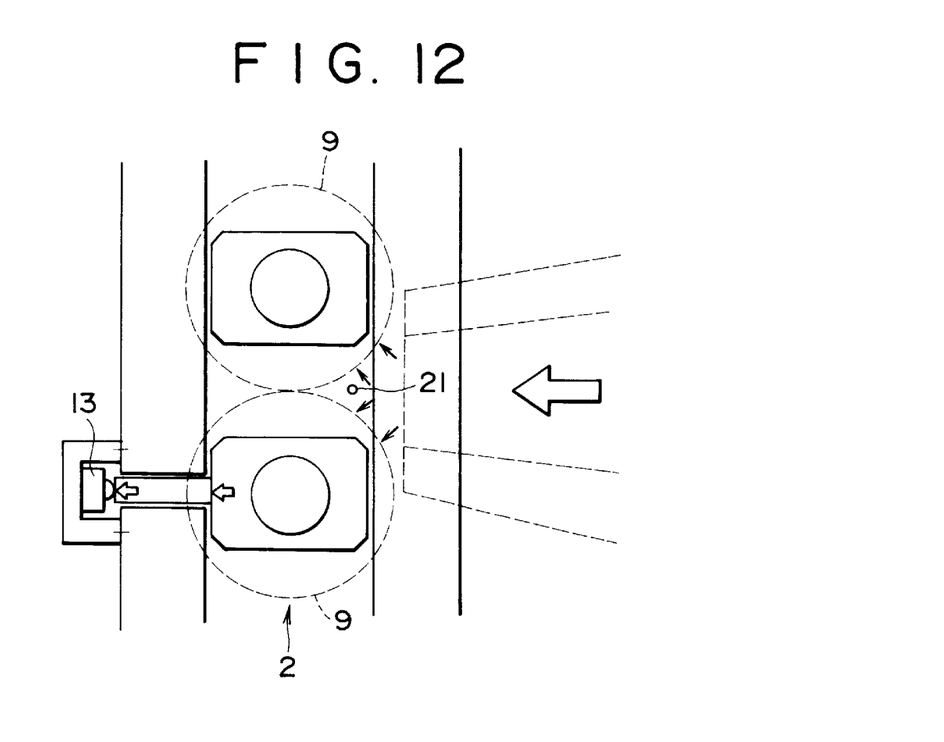
FIG. 12 is a sectional view showing a modification of a pressure sensor.

In this case, the temperature sensor as the minimum bank quantity detector 21 has to be provided in the installation position P similar to that in FIG. 3 in the side guide 20. The pressure sensor 13 for sensing the bank pressure is not limited to that provided in the bank portion 12. A load cell for indirectly detecting the bank pressure by detecting the load of the roller 9 of the roller die 2 as shown in FIG. 12 can be also used as the pressure sensor 13.

The pressure sensor 13 can also indirectly sense the bank pressure by sensing the pressure of the material in the chamber 4 having the extruding screws 3 as long as it is provided separately from the minimum bank quantity detector 21.

Although the bank quantity detector 14 was described as a level sensor comprising a light projector and a light receiver for detecting a certain level, a sensor for continuously sensing the level can be also used. A contact type potentiometer as described in Japanese Patent Publication 57-26936 can be also used.

The bank quantity detector 14 can detect the bank quantity not only by its level but also by volume, weight, or the like.

The "bank quantity" in the application denotes not only the unit of level but also volume, weight, or non-dimensional index.

Further, although the screw rotational speed is controlled in the embodiments, the rotational speed of the roller 9 of the roller die 2 can be also controlled or both of the speeds of the screw 3 and the roller 9 can be also controlled in the invention.

As mentioned above, according to the invention, since the preceding material can be succeeded by the following material without running out sheet when the material is replaced and without remaining the preceding material in the bank portion, the materials of different kinds can be continuously processed without burning the following material or causing no variation in physical properties.

By using the minimum bank quantity detector also as a pressure detecting means (pressure sensor) for obtaining the bank quantity target value to uniform the shape of the sheet, the extruder having the effects can be obtained as cheaply as possible.

What is claimed is:

1. A controlling device applied to an extruder in which a roller die having upper and lower parallel rollers is arranged in front of an outlet of the extruder body rotatably having screws for extruding a material and a bank portion surrounded by the upper and lower rollers and a side guide closing both of right and left sides of the outlet is formed, comprising:

minimum bank quantity detecting means which is provided for the side guide and detects a first bank quantity which is the minimum for a preceding material to be extruded to be succeeded by a following different material to be extruded in the bank portion;

roller die stop control means for stopping the roller die when the minimum bank quantity detecting means detects that the bank quantity is reduced to the first bank quantity;

said screws supplying the following different material to the bank portion;

bank quantity detecting means for detecting a second bank quantity at which the extruder can be operated; and roller die activation control means for activating the roller die when the bank quantity detecting means detects that the bank quantity is increased to the second bank quantity.

2. The controlling device according to claim 1, wherein the minimum bank quantity detecting means is a pressure sensor for sensing a pressure of the material to be extruded in the bank portion.

3. A controlling method applied to an extruder in which a roller die having upper and lower parallel rollers is arranged in front of an outlet of the extruder main body rotatably comprising screws for extruding material and a bank portion surrounded by the upper and lower rollers and a side guide closing both of right and left sides of the outlet is formed, the method comprising:

a step of detecting that a bank quantity reaches a first bank quantity which is the minimum for a preceding material to be extruded to be succeeded by a following different material to be extruded in the bank portion;

a step of stopping the roller die when it is detected that the bank quantity is reduced to the first bank quantity;

a step of supplying the following different material to the bank portion;

a step of detecting that the bank quantity reaches a second bank quantity at which the extruder can be operated; and a step of activating the roller die when it is detected that the bank quantity increases to the second bank quantity.

4. The method of claim 3, wherein the step of detecting that a bank quantity reaches said first bank quantity comprises detecting a bank quantity within a range of 5 to 15% of the capacity of the bank portion.

* * * * *